United States Patent [19]

Newman

[11] 4,005,914

[45] Feb. 1, 1977

[54] SURFACE COATING FOR MACHINE ELEMENTS HAVING RUBBING SURFACES

[75] Inventor: Paul Newman, Bristol, England

[73] Assignee: Rolls-Royce (1971) Limited, England

[22] Filed: Aug. 11, 1975

[21] Appl. No.: 603,604

[30] Foreign Application Priority Data

Aug. 20, 1974   United Kingdom ............ 36637/74

[52] U.S. Cl. .................................. 308/9; 308/241; 308/DIG. 1
[51] Int. Cl.² ....................................... F16C 35/00
[58] Field of Search ........ 308/5, 9, DIG. 1, DIG. 7, 308/238, 37, 121, 122, 160, 241; 29/195 T

[56] References Cited

UNITED STATES PATENTS

| | | | |
|---|---|---|---|
| 3,418,028 | 12/1968 | Watson et al. | 308/241 |
| 3,677,612 | 7/1972 | Barnett | 308/9 X |

Primary Examiner—Joseph F. Peters, Jr.
Assistant Examiner—Gene A. Church
Attorney, Agent, or Firm—Stevens, Davis, Miller & Mosher

[57] ABSTRACT

In a foil gas bearing or other similar machine element the relatively rigid shaft is coated with a glaze-forming oxide layer between 0.003 and 0.020 ins. thick, while the relatively thin foils are coated with a layer of a compound comprising cobalt and chromium carbide to a depth of up to 0.003 ins., the surface layer of which is oxidized to a depth of 0.0001 ins. to 0.0005 ins.

7 Claims, 3 Drawing Figures

SURFACE COATING FOR MACHINE ELEMENTS HAVING RUBBING SURFACES

The present invention relates to surface coatings for machine elements, of the kind in which there is relative rotation between a relatively rigid component and a relatively flexible component at high speed, for example foil gas bearings.

In the operation of foil gas bearings there is contact between the two components at start-up and run-down of the bearing, and there is also a possibility that under high loading there may also be contact between the components at high speed.

In order to preserve the lives of the bearing surfaces of the components they have hitherto been coated with low friction materials such as P.T.F.E., but these materials have not been able to operate at high temperatures such as, for example are found in gas turbine engines. Thus in order to produce a bearing suitable for use in a hot gas turbine environment it has been necessary to develop a coating which has both the required low friction properties and which does not break down at temperatures up to 550° C.

It is known from published research results that oxides of certain metallic elements form glazes during wear at elevated temperatures, and that the glazes have low friction characteristics. However the known results provide no information as to the application of such glazes to the reduction of wear between relatively rotating components of machine elements of the kind described.

We have now carried out research into applying glaze-forming coatings to the components of such machine elements, in particular with foil gas bearings, and have found that oxide layers above 1.001–0.003 ins. thickness will not adhere to the flexible components under operating conditions for a significant length of time but will break up due to the flexing of the component. But if the oxide layers are reduced in thickness they are more prone to failure due to foreign object damage, for example if dust is ingested into the machine element.

The present invention provides a machine element having a combination of surface layers of glaze-forming oxides of different thicknesses on its components which overcomes the above problem.

According to the present invention in a machine element of the kind described, the relatively rigid component is provided with a surface layer of a glaze-forming oxide of between 0.003–0.020 ins. thick and the relatively flexible component is provided with a surface layer of a glaze-forming oxide between 0.0001 ins. and 0.0005 ins. thick.

We have found that with the above combination of coatings on the components of the machine element, the oxide will not crack off from the flexible component, and although foreign object ingestion will damage the thin oxide layer of the flexible component, even to the extent of exposing bare metal, the thick oxide layer on the rigid member will not normally be penetrated to expose bare metal, and failure of the element is prevented. We have also found that the thin glaze layer has self-healing properties in so far as the exposed bare metal will oxidise, and rubbing contact will re-form the glaze.

The thickness of the oxide layer on the relatively rigid component is preferably in the range 0.003 ins. to 0.007 ins., and the thickness of the oxide layer on the flexible component is preferably of the order of 0.0002 ins.

The metallic elements from which the oxide layers are formed may be chosen from nickel, chromium, iron and cobalt although it is believed that other oxides may form glazes and any glaze-forming oxide would be suitable.

According to a feature of the present invention, a foil gas bearing comprises a relatively rigid shaft surrounded by a plurality of foil elements, and the shaft is coated with a glaze-forming oxide to a thickness in the range 0.003 to 0.007 ins, and the foils are coated with a layer of a compound of cobalt and chromium carbide the surface of which is oxidised to a depth of up to 0.0005 ins.

The invention will now be more particularly described with reference to the accompanying drawings in which.

Figure 1:
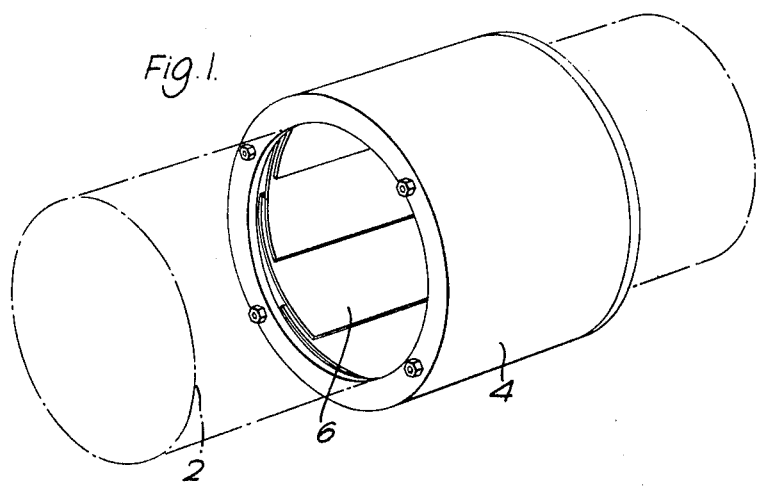
FIG. 1 illustrates a foil bearing to which the invention is applied.

Referring now to the drawings, a foil element bearing is illustrated, and comprises a shaft 2 which is supported for rotation in a bearing bush 4. The bush 4 is stationary and has mounted in its interior, a plurality of foil bearing elements 6. In the example shown, there are eight elements 6 each of which subtend an angle of approximately 90° and which overlap by about 50% the adjacent elements. The elements 6 are held in place in slots in the bush 4. Foil gas bearings are in themselves known, for example, from U.S. Pat. No. 3,215,480, and since the present invention relates to the treatment of the bearing surfaces of the components, of this and other forms of machine elements, the bearing is not described in great detail.

Figure 2:
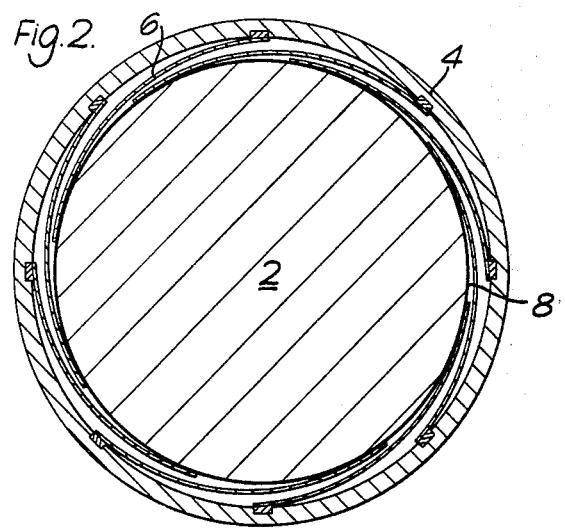
FIG. 2 is a cross-section of the bearing of FIG. 1 showing diagrammatically the disposition of the foils and coatings.
Figure 3:
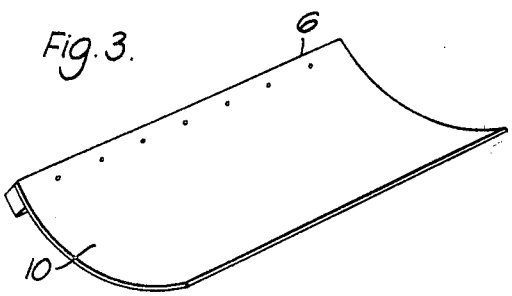
FIG. 3 shows a foil illustrating the oxided surface thereof.

The coating on the shaft is depicted by the thick line 8 in FIG. 2 and the oxided surface layer of a foil is shown at 10 in FIG. 3.

In the operation of such a bearing the shaft rotates within the foils 6, and air is trapped between the foils and the shaft so that an air cushion is produced between the foils and a bearing surface on the shaft, which cushion supports a load on the bearing by preventing contact between the bearing surfaces.

The above described bearing is one example of a gas bearing which runs without the usual oil lubrication, and such bearings are usually required to run dry with the bearing surfaces in contact on start up, for a sufficient length of time for the air cushion to become established, and for the shaft to lift off the surface of the bearing bush. During this time, the bearing surfaces wear due to friction and very smooth wear resistant surfaces are required.

The present invention provides a surface treatment which is particularly applicable to gas bearings and which produces a very smooth surface having low friction and wear properties.

Tests were conducted simulating a foil element bearing as described with reference to FIGS. 1 and 2 but using a single foil pivotally mounted above a shaft so as to be capable of being brought into rubbing contact with a specially provided bearing surface on the shaft, at varying bearing pressures. The shaft was driven during the tests at a speed of approximately 5,500 r.p.m. and a series of stopstart cycles was performed to represent the initial running period of an air bearing, each test being terminated when "pick-up" occurred.

Several combinations of coatings of oxides were tried and found not to give the bearing any significant life. For example, it was found that, if both the shaft and the foils were coated with 0.001 to 0.002 ins. of a material containing chromium or cobalt in oxidisable quantitites and the surface layers of the coating were oxidised to a depth of 0.0002 ins. by heating in the air, the bearing was prone to failure due to ingestion of atmospheric dust particles which scored the oxide layers and exposed the bare metal substrates of the shaft and foils. The subsequent metal to metal contact caused failure of the bearing.

Thick coatings of oxide on the foil, however, were found to break up as the foil flexed.

The solution to these problems was found to be the provision on the shaft of a coating of oxide of between 0.003 ins. and 0.007 ins. thick, in combination with an oxide coating on the foil of between 0.0001 ins. and 0.0005 ins.

By this means the oxide layer on the foil was thin enough to flex with the foil in operation without cracking, while metal to metal contact after debris ingestion was avoided because the scoring of the oxide surface on the shaft was not deep enough to expose substrate material of the shaft to the scored foil. In addition it was found that the thin oxide layer on the foil had a self-healing property and the scores soon became smoothed out into a continuous oxide surface again.

The thick oxide coating on the shaft was provided by plasma spraying cobalt oxide or chromium oxide directly onto the shaft. Although the cobalt oxide seemed to provide the better glaze, there were difficulties in spraying the oxide, but the chromium oxide could be applied by a commercially available process. Clearly other oxides known to form glazes could be substituted. The thickness of the coatings on the shaft may be varied but it is expected that a minimum thickness of 0.003 ins. is necessary to avoid scoring through the coating by dust and grit normally in the bearing environment. In particular, in a gas turbine engine environment it is believed that a coating thickness of up to 0.010 ins. is required to give an adequate safety margin. Coatings of up to 0.020 ins. may be used on the shaft but at this thickness some cracking was noticed after a relatively short life.

On the foil, however, it was not found to be possible to plasma spray the oxide directly, although vapour deposition could be used.

The preferred method was to first coat the foil with a compound comprising 75% cobalt and 25% chromium carbide by volume to a thickness of between 0.001 and 0.002 ins. and then to oxidise the surface layer to a depth of approximately 0.0002 ins. by heating in air. The cobalt and chromium carbide compound is sold under the trade name of TRIBOMET 104C by the Bristol Aerojet Company.

The preparation of the bearing surfaces was important for producing the required surface finish and the method found to produce the best results was as follows:

On the shaft, the shaft surface was vapour blasted and sprayed with a bond coat of Nickel Aluminide to a thickness of 0.002 in. to 0.003 in. and then Cobalt Oxide or chromium oxide was plasma sprayed onto the surface to a depth of up to 0.010 ins. The surface of the shaft was ground and lapped to a smooth finish. A similar treatment would apply to other oxide coatings.

The foil, which was made from a Nickel-based alloy known as NIMONIC 90 and was 0.005 ins. thick was first acid etched and then electro-plated with TRIBOMET T104C to a depth of 0.001 to 0.0015 ins. The surface layer was then diamond lapped to a thickness of 0.0005 to 0.001 ins. to a surface finish 1 to 2 micro ins. CLA (Centre line average). This is a mirror finish. While a minimum thickness of say 0.002 ins. of TRIBOMET 104C is preferable, thicknesses of around 40% of the thickness of the foil may be used. The lapping ensured that the variation in thickness of the foil substrate and coating was uniform to 0.0002 to 0.0004 ins.

The coated foil was then oxidised in air by heating to 600° for 4 hours which gave a uniform oxide coating 0.0002 ins. thick.

The invention has been described in relation to a particular type of known air bearing. Clearly, however, the surface treatment of the present invention is applicable to any machine element of the kind described for example, seals which have relatively rigid and relatively flexible components running at very small clearances.

One of the main advantages of the surface treatment of the invention is that the oxide coating has a high melting point, and that enables bearings with the oxided surfaces to run at much higher temperatures than hitherto. For example conventional gas turbine engine bearings are limited at present to operation below 250° C because of the temperature limitations on the lubricating oil required. Air bearings with oxided surfaces can be run at temperatures in excess of 550° C and are limited more by the substrate material than the oxide coating. In fact, the self healing properties of the oxide glaze are improved as the temperature increases.

I claim:

1. A machine element comprising a relatively rigid component and a relatively flexible component adapted for relative rotation and wherein the relatively rigid component is provided with a surface layer of a glaze-forming oxide between 0.003 ins. and 0.020 ins. thick, and the relatively flexible component is provided with a surface layer of a glaze-forming oxide between 0.0001 ins. and 0.0005 ins. thick.

2. A machine element according to claim 1 and wherein the oxide layer in the relatively rigid member is between 0.003 ins. and 0.007 ins. thick.

3. A machine element according to claim 1 and wherein the glaze-forming oxide on the relatively rigid component is an oxide of Cobalt.

4. A machine element according to claim 1 and wherein the glaze-forming oxide on the relatively rigid component is an oxide of Chromium.

5. A machine element according to claim 1 and wherein the relatively flexible component is coated with a compound consisting of cobalt and chromium carbide, the surface layer of which is oxidized to provide the glaze-forming oxide layer.

6. A machine element according to claim 5 and wherein said compound consists of 75% cobalt and 25% chromium carbide by volume.

7. A machine element according to claim 1 and wherein the machine element is a foil gas bearing which comprises a relatively rigid shaft and a plurality of relatively flexible foils for supporting the shaft in operation on a cushion of air, wherein the shaft is provided with a surface layer of a glaze-forming oxide between 0.003 ins. and 0.020 ins. thick, and each foil is provided with a surface layer of a glaze-forming oxide between 0.0001 ins. and 0.0005 ins. thick.

* * * * *